US010990635B2

(12) United States Patent
Dimson et al.

(10) Patent No.: US 10,990,635 B2
(45) Date of Patent: *Apr. 27, 2021

(54) SYSTEMS AND METHODS FOR RANKING EPHEMERAL CONTENT ASSOCIATED WITH A SOCIAL NETWORKING SYSTEM

(71) Applicant: Facebook, Inc., Menlo Park, CA (US)

(72) Inventors: Thomas Frederick Dimson, Stanford, CA (US); Rui Wang, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 15/633,643

(22) Filed: Jun. 26, 2017

(65) Prior Publication Data

US 2018/0373794 A1     Dec. 27, 2018

(51) Int. Cl.
| | | |
|---|---|---|
| *G06F 16/00* | (2019.01) | |
| *G06F 16/9535* | (2019.01) | |
| *G06N 7/00* | (2006.01) | |
| *H04L 29/08* | (2006.01) | |
| *G06N 5/02* | (2006.01) | |
| *G06N 20/00* | (2019.01) | |

(52) U.S. Cl.
CPC ......... *G06F 16/9535* (2019.01); *G06N 5/022* (2013.01); *G06N 7/005* (2013.01); *G06N 20/00* (2019.01); *H04L 67/22* (2013.01); *H04L 67/306* (2013.01)

(58) Field of Classification Search
CPC .... G06F 18/9535; G06N 20/00; G06N 7/005; H04L 67/22; H04L 67/306
See application file for complete search history.

(56) References Cited

U.S. PATENT DOCUMENTS

| | | | | |
|---|---|---|---|---|
| 6,581,056 | B1* | 6/2003 | Rao | G06F 16/338 |
| 10,157,333 | B1* | 12/2018 | Wang | G06T 1/0007 |
| 10,165,402 | B1* | 12/2018 | Davis | G06F 16/48 |
| 10,296,512 | B1* | 5/2019 | Chandran | G06F 16/24578 |
| 10,345,987 | B1* | 7/2019 | Andreou | H04N 5/44543 |
| 10,382,373 | B1* | 8/2019 | Yang | G06F 16/22 |
| 10,402,689 | B1* | 9/2019 | Bogdanovych | G06K 9/6807 |
| 10,496,272 | B1* | 12/2019 | Lonkar | G06N 5/04 |
| 10,540,575 | B1* | 1/2020 | Brody | H04N 5/23293 |
| 10,552,968 | B1* | 2/2020 | Wang | G06K 9/3233 |
| 10,581,953 | B1* | 3/2020 | Brewer | G06N 7/005 |
| 2015/0163189 | A1* | 6/2015 | Proctor | G06F 16/248 |
| | | | | 715/753 |
| 2016/0063223 | A1* | 3/2016 | Raley | G06F 21/105 |
| | | | | 705/51 |
| 2017/0289234 | A1* | 10/2017 | Andreou | G06F 3/04845 |

(Continued)

*Primary Examiner* — Jean M Corrielus
(74) *Attorney, Agent, or Firm* — Sheppard Mullin Richter & Hampton LLP

(57) ABSTRACT

Systems, methods, and non-transitory computer readable media can obtain a plurality of ephemeral content collections that are candidates for an ephemeral content feed of a user, wherein each of the plurality of ephemeral content collections includes one or more ephemeral content items. A score for each of the plurality of ephemeral content collections can be determined based at least in part on a probability of the user selecting the ephemeral content collection. The plurality of ephemeral content collections can be ranked based on the respective scores of the plurality of ephemeral content collections.

19 Claims, 9 Drawing Sheets

(56) References Cited

U.S. PATENT DOCUMENTS

| | | | |
|---|---|---|---|
| 2018/0241707 A1* | 8/2018 | Sarafa | H04W 4/12 |
| 2018/0241871 A1* | 8/2018 | Sarafa | H04W 12/0013 |
| 2018/0315076 A1* | 11/2018 | Andreou | G06Q 30/0244 |
| 2020/0120097 A1* | 4/2020 | Amitay | H04W 4/02 |
| 2020/0120170 A1* | 4/2020 | Amitay | H04W 4/021 |

* cited by examiner

Ephemeral Content Collection Ranking Module 202

Ephemeral Content Collection Training Module 204

Ephemeral Content Collection Evaluation Module 206

```
┌─────────────────────────────────────────────────────────────────┐
│ Obtain a plurality of ephemeral content collections that are    │
│ candidates for an ephemeral content feed of a user, wherein     │
│ each of the plurality of ephemeral content collections includes │
│ one or more ephemeral content items                             │
│ 402                                                             │
└─────────────────────────────────────────────────────────────────┘
                                │
                                ▼
┌─────────────────────────────────────────────────────────────────┐
│ Determine a score for each of the plurality of ephemeral        │
│ content collections based at least in part on a probability of  │
│ the user selecting the ephemeral content collection             │
│ 404                                                             │
└─────────────────────────────────────────────────────────────────┘
                                │
                                ▼
┌─────────────────────────────────────────────────────────────────┐
│ Rank the plurality of ephemeral content collections based on    │
│ the respective scores of the plurality of ephemeral content     │
│ collections                                                     │
│ 406                                                             │
└─────────────────────────────────────────────────────────────────┘
```

FIGURE 4

SYSTEMS AND METHODS FOR RANKING EPHEMERAL CONTENT ASSOCIATED WITH A SOCIAL NETWORKING SYSTEM

FIELD OF THE INVENTION

The present technology relates to the field of social networks. More particularly, the present technology relates to techniques for ranking content items associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user.

SUMMARY

Various embodiments of the present disclosure can include systems, methods, and non-transitory computer readable media configured to obtain a plurality of ephemeral content collections that are candidates for an ephemeral content feed of a user, wherein each of the plurality of ephemeral content collections includes one or more ephemeral content items. A score for each of the plurality of ephemeral content collections can be determined based at least in part on a probability of the user selecting the ephemeral content collection. The plurality of ephemeral content collections can be ranked based on the respective scores of the plurality of ephemeral content collections.

In some embodiments, the score for each of the plurality of ephemeral content collections is determined based at least in part on a value model including one or more factors.

In certain embodiments, the one or more factors include one or more of: a probability of the user sending a direct message associated with the ephemeral content collection, a probability of the user spending time on the ephemeral content collection, or a probability of the user abandoning the ephemeral content collection.

In an embodiment, each of the one or more ephemeral content items included in an ephemeral content collection of the plurality of ephemeral content collections is accessible only for a predetermined time period.

In some embodiments, an ephemeral content collection of the plurality of ephemeral content collections is accessible only when at least one of the one or more ephemeral content items included in the ephemeral content collection is accessible.

In certain embodiments, a machine learning model can be trained based on a plurality of features selected from one or more of: ephemeral content collection attributes, ephemeral content item attributes, or user attributes, and the machine learning model can be applied to determine the score for each of the plurality of ephemeral content collections.

In an embodiment, each of the plurality of ephemeral content collections is associated with a specific user and includes one or ephemeral content items created by the specific user.

In some embodiments, each of the plurality of ephemeral content collections is associated with a topic and is not associated with a specific user.

In certain embodiments, the one or more ephemeral content items included in an ephemeral content collection of the plurality of ephemeral content collections can be ranked.

In an embodiment, at least some of the ranked plurality of ephemeral content collections can be provided in the ephemeral content feed of the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2A illustrates an example ephemeral content collection ranking module configured to rank ephemeral content collections associated with a social networking system, according to an embodiment of the present disclosure.

FIG. 4 illustrates an example first method for ranking ephemeral content associated with a social networking system, according to an embodiment of the present disclosure.

Figure 1:
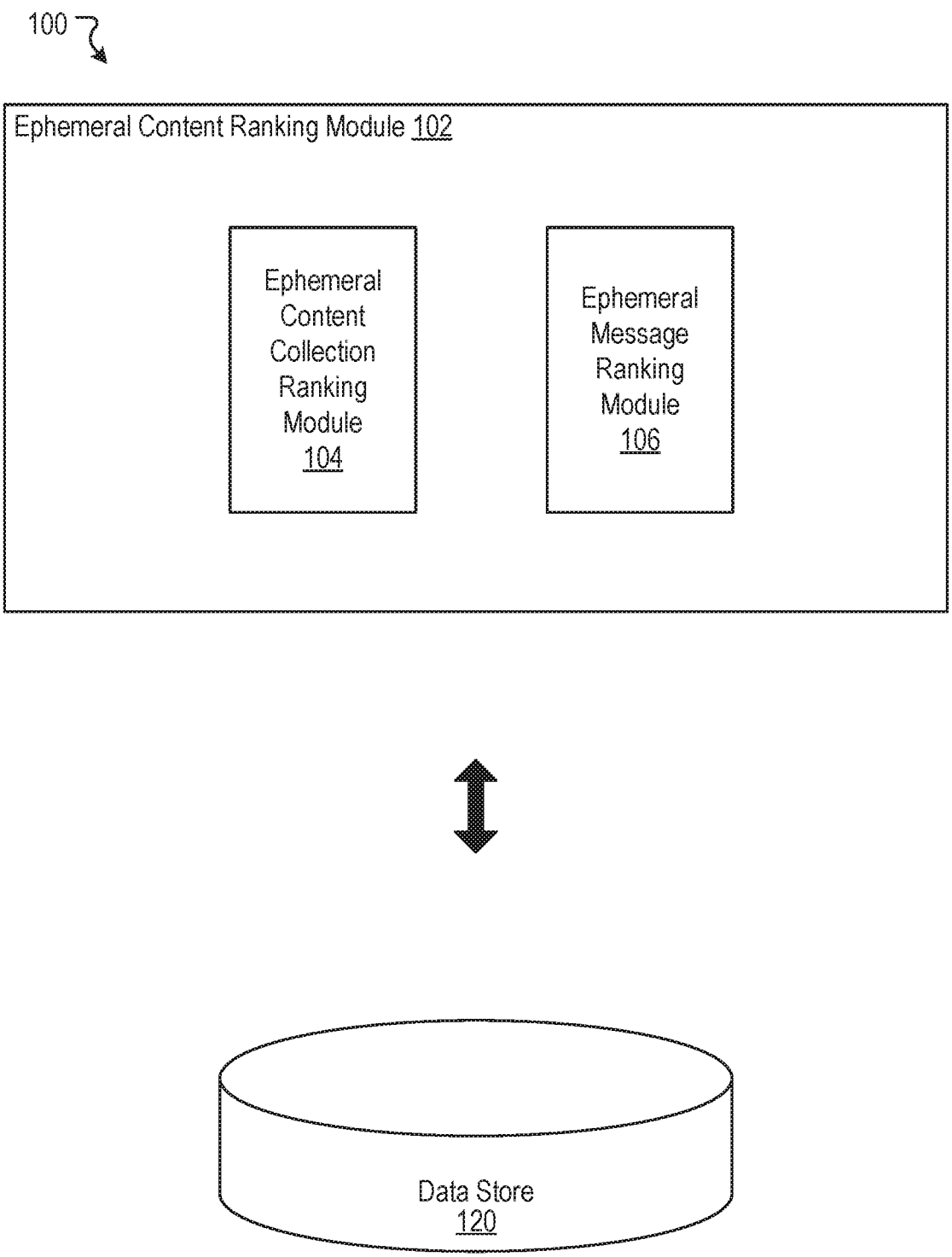
FIG. 1 illustrates an example system including an example ephemeral content ranking module configured to rank ephemeral content associated with a social networking system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Ranking Ephemeral Content Associated with a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

In some cases, content items available in a social networking system can be ephemeral. For example, a content item can only be accessible for a period of time and expire after the period of time. Ephemeral content items may be available via an ephemeral content feed. For example, an ephemeral content feed can be presented in a region of a user interface of a computing device running an application associated with the social networking system. Ephemeral content items can be organized as or in an ephemeral content collection. For example, each user can have an ephemeral content collection that includes one or more ephemeral content items created by the user. In some instances, an ephemeral content collection includes a collection or group of related content items. An ephemeral content collection can also be referred to as a "story." An ephemeral content feed of a user can display or provide ephemeral content collections of different users, including the user's own ephemeral content collection. Ephemeral content collections of users can be displayed using various representations, such as avatars of the users. Ephemeral content items of a user can be accessed by selecting a representation of the ephemeral content collection of the user. An ephemeral content feed can rank ephemeral content collections, and the highest ranked ephemeral content collections can be presented to a user through a user interface of a computing device of the user. For example, conventional approaches specifically arising in the realm of computer technology can rank ephemeral content collections in an ephemeral content feed in chronological order or reverse chronological order. However, ranking ephemeral content collections in a user's ephemeral content feed in chronological order or reverse chronological order may not result in presentation of ephemeral content collections that include ephemeral content items the user is most likely to find interesting.

An improved approach rooted in computer technology can overcome the foregoing and other disadvantages associated with conventional approaches specifically arising in the realm of computer technology. Based on computer technology, the disclosed technology can rank ephemeral content collections to include in an ephemeral content feed of a user based on various factors. Ephemeral content collections can be ranked in order to increase engagement by the user with ephemeral content collections. For example, ephemeral content collections can be ranked based on a probability of a user selecting an ephemeral content collection and a value model. The value model can be a proxy for user interest and reflect what users value when interacting with ephemeral content items. The value model can incorporate appropriate factors to rank ephemeral content collections. Such factors can include a probability of sending a message (e.g., a direct message) to a user, a probability of spending time on an ephemeral content collection or an ephemeral content item, an event that is happening currently, a probability of abandoning an ephemeral content collection or an ephemeral content item, etc. Ephemeral content collections can be ranked based on machine learning techniques. For example, a machine learning model can be trained based on features associated with ephemeral content collections, and the trained machine learning model can rank ephemeral content collections. Features associated with ephemeral content collections can relate to the probability of a user selecting an ephemeral content collection and the value model. Ephemeral content collections can include user-based ephemeral content collections and topic-based ephemeral content collections. In certain embodiments, the disclosed technology can also rank ephemeral message threads in a user's ephemeral message feed. One or more ephemeral messages can be exchanged between users through an ephemeral message thread, and ephemeral message threads can be ranked in a similar manner as ephemeral content collections. In this manner, the disclosed technology can rank and prioritize ephemeral content that a user is most likely to find interesting.

FIG. 1 illustrates an example system 100 including an example ephemeral content ranking module 102 configured to rank ephemeral content associated with a content providing platform, such as a social networking system, according to an embodiment of the present disclosure. The ephemeral content ranking module 102 can include an ephemeral content collection ranking module 104 and an ephemeral message ranking module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the ephemeral content ranking module 102 can be implemented in any suitable combinations. While the disclosed technology is described in connection with ephemeral content associated with a social networking system for illustrative purposes, the disclosed technology can apply to any other type of system and/or content.

Ephemeral content can refer to any type of content that is accessible only for a predetermined time period (e.g., second(s), minute(s), hour(s), day(s), etc.) or for a predetermined number of times (e.g., once, twice, etc.). For example, ephemeral content can expire after the predetermined time period passes or upon viewing by a user. In some instances, ephemeral content may be removed from servers and/or storage devices after expiration so that they are not accessible after their expiration. An ephemeral content item can refer to a content item that is ephemeral. One or more ephemeral content items created by users can be organized as or in an ephemeral content collection. There can be different categories of ephemeral content collections, such as user-based ephemeral content collections and topic-based ephemeral content collections. A user-based ephemeral content collection can be associated with a specific user and include one or more ephemeral content items created by the specific user. A topic-based ephemeral content collection is not associated with a specific user, but rather with a topic or a subject matter. For example, a topic-based ephemeral content collection relating to a city can include ephemeral content items from different users that relate to the city. An ephemeral content collection can appear or be accessible in an ephemeral content feed until all ephemeral content items included in the ephemeral content collection expire. In some embodiments, an ephemeral content collection can appear or be accessible in an ephemeral content feed for a predetermined time period (e.g., second(s), minute(s), hour(s), day(s), etc.). An ephemeral content collection can be represented in a user interface in various ways. For example, a user-based ephemeral content collection can be represented by an avatar of a user, an icon, an image, an animation, a video, etc. Similarly, a topic-based ephemeral content collection can also be represented in a user interface in various ways, for example, by an icon, an image, an animation, a video, etc. As another type of ephemeral content, an ephemeral message can refer to a message, sent through or supported by an instant messaging system or application, between users that is ephemeral. For example, an ephemeral message can expire for a recipient user upon the recipient user viewing or otherwise accessing message content of the ephemeral message. An ephemeral message can be sent in an ephemeral message thread. An ephemeral message thread can be represented in a user interface in various ways. For example, an ephemeral message thread can be represented by avatars of users included in the ephemeral message thread, one or more icons, one or more images, one or more animations, one or more videos, etc. As used herein, any content that is not ephemeral content can be referred to as non-ephemeral content.

The ephemeral content collection ranking module 104 can rank ephemeral content collections associated with a social networking system. The ephemeral content collection ranking module 104 can rank ephemeral content collections based on a probability of selection of ephemeral content collections by viewing users and a value model. The ephemeral content collection ranking module 104 is described in more detail herein.

The ephemeral message ranking module 106 can rank ephemeral message threads associated with a social networking system. The ephemeral message ranking module 106 can rank ephemeral message threads based on a probability of selection of or other interaction with ephemeral message threads by recipient users and a value model. The ephemeral message ranking module 108 is described in more detail herein.

In some embodiments, the ephemeral content ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the ephemeral content ranking module 102 can be, in part or in whole, implemented as software running on one or more computing devices or systems, such as on a server system or a client computing device. In some instances, the ephemeral content ranking module 102 can be, in part or in whole, implemented within or configured to operate in conjunction or be integrated with a social networking system (or service), such as a social networking system 630 of FIG. 6. Likewise, in some instances, the ephemeral content ranking module 102 can be, in part or in whole, implemented within or configured to operate in conjunction or be integrated with a client computing device, such as the user device 610 of FIG. 6. For example, the ephemeral content ranking module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the ephemeral content ranking module 102. The data maintained by the data store 120 can include, for example, information relating to ephemeral content, ephemeral content feeds, ephemeral content collections, ephemeral content items, ephemeral messages, machine learning models, ranking data, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the ephemeral content ranking module 102 can be configured to communicate and/or operate with the data store 120. In some embodiments, the data store 120 can be a data store within a client computing device. In some embodiments, the data store 120 can be a data store of a server system in communication with the client computing device.

FIG. 2A illustrates an example ephemeral content collection ranking module 202 configured to rank ephemeral content collections associated with a social networking system, according to an embodiment of the present disclosure. In some embodiments, the ephemeral content collection ranking module 104 of FIG. 1 can be implemented with the example ephemeral content collection ranking module 202. As shown in the example of FIG. 2A, the example ephemeral content collection ranking module 202 can include an ephemeral content collection training module 204 and an ephemeral content collection evaluation module 206.

The ephemeral content collection ranking module 202 can rank ephemeral content collections that are candidates for inclusion in a viewing user's ephemeral content feed. The ephemeral content collection ranking module 202 can rank different types of ephemeral content collections, such as user-based ephemeral content collections and topic-based ephemeral content collections. A user-based ephemeral content collection can be associated with a specific authoring user. A topic-based ephemeral content collection is not associated with a specific authoring user, but can be associated with a topic or a subject matter and include ephemeral content items of many authoring users. An authoring user can refer to a user who creates an ephemeral content item included in an ephemeral content collection. A viewing user can refer to a user who has access to an ephemeral content collection in the viewing user's ephemeral content feed. Ephemeral content collections can be ranked to increase a likelihood of engagement with ephemeral content collections by a viewing user. Some or all of ranked ephemeral content collections can be displayed in a viewing user's ephemeral content feed. Ephemeral content collections can be ranked based on various factors, including a probability of a viewing user selecting an ephemeral content collection and a value model. As an example, a score to rank an ephemeral content collection can be determined as follows:

$$\text{score} = P(\text{select}) * \text{value model} \tag{1}$$

where score indicates a score assigned to an ephemeral content collection, P(select) indicates a probability of a viewing user selecting the ephemeral content collection, and value model indicates a value model that reflects user interest. The score of an ephemeral content collection can indicate a likelihood of engagement by a viewing user. As an example, a viewing user can engage with an ephemeral content collection in the viewing user's ephemeral content feed by selecting the ephemeral content collection. A viewing user can select an ephemeral content collection in various manners, for example, by a click, a touch gesture, etc.

A value model can act as a proxy for user interest and can include any appropriate factors. A value model can be defined as appropriate and can vary for different categories of ephemeral content collections and/or for different types of ephemeral content. For example, a value model for user-based ephemeral content collections and a value model for topic-based ephemeral content collections can be different and include different factors. In some embodiments, a value model for user-based ephemeral content collections can include factors, such as a probability of a viewing user sending a message (e.g., a direct message) to an authoring user (or another user), a probability of a viewing user spending time on an ephemeral content collection or an ephemeral content item, a probability of a viewing user abandoning an ephemeral content collection or an ephemeral content item, an event that is happening currently, a type of reaction by a viewing user, etc. In some embodiments, P(select) can be considered a factor in a value model. Many variations are possible.

In an example discussing the factors referenced above, a viewing user can select an ephemeral content collection. Upon such selection, an immersive viewer can be provided in a user interface displaying the viewing user's ephemeral content feed, and the viewing user can view ephemeral content items of the ephemeral content collection. The viewing user may also transition within the immersive viewer between ephemeral content items of different ephemeral content collections displayed in the viewing user's ephemeral content feed. The viewing user may send a direct message to an authoring user, spend time viewing an ephemeral content collection or an ephemeral content item, or abandon an ephemeral content collection or an ephemeral content item. The viewing user can abandon an ephemeral content collection or an ephemeral content item by exiting or closing the immersive viewer, transitioning to another ephemeral content collection or another ephemeral content item. An event that is happening currently or imminently can also be relevant to a value model since ephemeral content collections or ephemeral content items relating to the event may be of interest to a viewing user. There can be different types of reactions that a viewing user can select for an ephemeral content item, and the different types of reactions can also be relevant to a value model. Examples of reactions can include likes, comments, shares, emojis, etc.

Since a value model can include different factors, equation (1) can be rewritten to expressly include one or more factors in the value model as appropriate. The probability of a viewing user sending a direct message to an authoring user can be denoted as P(dm). The probability of a viewing user spending time on an ephemeral content item can be denoted as P(spending time). The probability of a viewing user abandoning an ephemeral content item can be denoted as P(ab). As an example, if a value model includes P(dm), the score to rank an ephemeral content collection can be determined as follows:

$$score = P(select) * P(dm) \qquad (2),$$

where score indicates a score assigned to an ephemeral content collection, P(select) indicates a probability of a viewing user selecting the ephemeral content collection, and P(dm) indicates a probability of a viewing user sending a direct message to an authoring user. Some or all of probabilities may be conditioned on the probability of a viewing user selecting an ephemeral content collection, P(select). For example, sending a direct message to an authoring user regarding an ephemeral content collection or an ephemeral content item can occur after a viewing user selects an ephemeral content collection. Accordingly, the probability of a viewing user sending a direct message to an authoring user can be expressed as P(dm|select). In some embodiments, P(dm) can be substituted by P(dm|select) in equation (2). Similarly, the probability of a viewing user spending time on an ephemeral content collection or an ephemeral content item can be expressed as P(spending time|select), and the probability of a viewing user abandoning an ephemeral content collection or an ephemeral content item can be expressed as P(ab|select). If the value model includes more than one factor, multiple factors can be included in equation (1). In certain embodiments, a weight can be assigned to each factor in the value model. For example, equation (2) can be written as follows:

$$score = P(select) * w_1 P(dm) \qquad (3),$$

where score indicates a score assigned to an ephemeral content collection of an authoring user, P(select) indicates a probability of a viewing user selecting the ephemeral content collection, $w_1$ indicates a weight assigned to P(dm), and P(dm) indicates a probability of a viewing user sending a direct message to the authoring user. In some embodiments, a weight can also be assigned to P(select).

The ephemeral content collection training module 204 can train a machine learning model to rank ephemeral content collections for a viewing user's ephemeral content feed. The ephemeral content collection training module 204 can train the machine learning model to rank ephemeral content collections based on training data that includes ephemeral content collections and various attributes associated with ephemeral content collections and factors in a value model. For example, for user-based ephemeral content collections, the training data (labeled data) can indicate whether user-based ephemeral content collections have been selected by viewing users, whether viewing users sent direct messages in connection with user-based ephemeral content collections or ephemeral content items thereof, whether viewing users spent time in connection with user-based ephemeral content collections or ephemeral content items thereof, an amount of time spent by viewing users in connection with user-based ephemeral content collections or ephemeral content items thereof, whether viewing users abandoned user-based ephemeral content collections or ephemeral content items thereof, any events that occurred in connection with user-based ephemeral content collections or ephemeral content items thereof, reactions or types of reactions in connection with user-based ephemeral content collections or ephemeral content items thereof, and any other information associated with the value model. Various features can be used in training the machine learning model. Features can relate to a probability of a viewing user selecting an ephemeral content collection, a value model, and factors in the value model. For example, features can be selected from ephemeral content collection attributes, ephemeral content item attributes, user attributes, etc. Ephemeral content collection attributes can include any attributes associated with ephemeral content collections. Examples of ephemeral content collection attributes relating to user-based ephemeral content collections can include an authoring user of a user-based ephemeral content collection, one or more ephemeral content items included in a user-based ephemeral content collection, one or more viewing users of a user-based ephemeral content collection and/or an ephemeral content item, a rate of selection of a user-based ephemeral content collection by viewing users, a selection of a user-based ephemeral content collection by a specific viewing user, a rate of selection of an ephemeral content item by viewing users, a selection of an ephemeral content item by a specific viewing user, historical information associated with a user-based ephemeral content collection, etc. Historical information associated with a user-based ephemeral content collection can include whether a viewing user has selected a user-based ephemeral content collection of a particular authoring user at one or more previous times when the user-based ephemeral content collection of the authoring user was included in the viewing user's ephemeral content feed, a ranking or position of a user-based ephemeral content collection of a particular authoring user at one or more previous times when the user-based ephemeral content collection was included in the viewing user's ephemeral content feed, etc. Ephemeral content item attributes can include any attributes associated with ephemeral content items. Examples of ephemeral content item attributes can include content attributes, such as a type of media (e.g., an image, a video, an audio, text, etc.), a length of content, a subject matter, one or more objects represented in content, a popularity of content (e.g., many users interacting with content), etc. User attributes can include any attributes associated with users. User attributes can include attributes associated with authoring users and attributes associated with viewing users. Examples of user attributes can include a location (e.g., a country, state, county, city, etc.), an age, an age range, a gender, a language, a number of connections (e.g., friends or followers), an interest, a device, an operating system (OS), etc. User attributes can also include attributes associated with connections between authoring users and viewing users. For example, a user can be a connection of another user (e.g., a friend or a follower), and a coefficient or weight can be associated with the connection. The coefficient can be indicative of a strength of the connection. In some embodiments, a connection between two users is two-way such that when the connection is established between a first user and a second user, the two users are connections of each other. In other embodiments, a connection between two users can be one-way such that a first user is a connection of a second user, but the second user is not a connection of the first user. In these embodiments, users can be subscribers or followers of other users. User attributes can further include attributes associated with interactions between authoring users and viewing users. Examples of interactions between authoring users and viewing users can include whether a viewing user liked a content item in an authoring user's feed or profile, whether a viewing user sent a direct message to an authoring user, etc. In some embodiments, features can also relate to whether an ephemeral content collection includes a live ephemeral content item and whether an ephemeral content collection includes an expiring ephemeral content item. The ephemeral content collection training module 204 can determine which features are most successful in predicting increased engagement by users and use the determined features to train the machine learning model. Weights associated with various features used to train the machine learning model can be determined based on, for example, regression techniques. Weights associated with various factors in the value model can also be determined based on, for example, regression techniques. In certain embodiments, more than one machine learning model or a staged machine learning model can be used.

The ephemeral content collection training module 204 can retrain the machine learning model based on new or updated training data. For example, if information about new ephemeral content collections, new ephemeral content items, and/or new users becomes available, the ephemeral content collection training module 204 can train the machine learning model based on the information about new ephemeral content collections, new ephemeral content items, and interactions of new users therewith. Engagement of users with ephemeral content collections and/or ephemeral content items can be measured and used to train or retrain the machine learning model, for example, as a part of the training data. In some cases, users can provide feedback relating to ephemeral content collections and/or ephemeral content items, and feedback by users can be used to train or retrain the machine learning model, for example, as a part of the training data.

The ephemeral content collection evaluation module 206 can apply the trained machine learning model to rank ephemeral content collections for a viewing user's ephemeral content feed. The trained machine learning model can determine a score for each ephemeral content collection. For instance, the score for the ephemeral content collection can be based on the probability of the viewing user selecting the ephemeral content collection and the value model. As an example, the score can be based on any of equations described above, such as equations (1) through (3). The score for an ephemeral content collection can be indicative of a likelihood of engagement by the viewing user. Ephemeral content collections can be ordered according to their respective scores. At least some of the ranked ephemeral content collections can be provided in the viewing user's ephemeral content feed. For example, a predetermined number of top ranked ephemeral content collections can be provided in the viewing user's ephemeral content feed. In some embodiments, the ephemeral content collection evaluation module 206 can rank ephemeral content collections for a viewing user's ephemeral content feed each time the ephemeral content feed is refreshed. In these embodiments, ephemeral content collections and/or ordering of ephemeral content collections displayed to the viewing user may change each time.

The ephemeral content collection evaluation module 206 can adjust determined scores for ephemeral content collections based on various considerations. Examples of considerations can include whether an ephemeral content collection includes a live ephemeral content item and whether an ephemeral content collection includes an ephemeral content item that is close to expiration. Many variations are possible. As an example, an ephemeral content collection can include a live ephemeral content item, which can refer to an ephemeral content item that is broadcast in or near real time. Live content may be of special interest to viewing users, and a determined score for an ephemeral content collection can be adjusted (e.g., increased) if the ephemeral content collection includes a live ephemeral content item. In some embodiments, whether an ephemeral content collection includes a live ephemeral content item can be a feature in training the machine learning model. As another example, an ephemeral content collection can include an ephemeral content item that is close to expiration. An ephemeral content item can be close to expiration, for example, if a period of time between a current time and an expiration time of the ephemeral content item satisfies a threshold value (e.g., second(s), minute(s), hour(s), day(s), etc.). Viewing users may have special interest in viewing ephemeral content items that are close to expiration, and a determined score for an ephemeral content collection can be adjusted (e.g., increased) if the ephemeral content collection includes an expiring ephemeral content item. In some embodiments, whether an ephemeral content collection includes an expiring ephemeral content item can be a feature in training the machine learning model.

As explained above, the ephemeral content collection ranking module 202 can rank topic-based ephemeral content collections as well as user-based ephemeral content collections. In some embodiments, a topic-based ephemeral content collection can be a candidate for including in a viewing user's ephemeral content feed when the viewing user has contributed to the topic-based ephemeral content collection. For instance, a viewing user is considered to have contributed to a topic-based ephemeral content collection if the viewing user creates one or more ephemeral content items that relate to a topic or a subject matter relating to the topic-based ephemeral content collection. Examples of a topic or a subject matter can include a geographical location, an event, a theme, etc. One or more topic-based ephemeral content collections can be ranked and included in a viewing user's ephemeral content feed along with user-based ephemeral content collections. For example, user-based ephemeral content collections and any topic-based ephemeral content collections can be ranked in order of respective scores for inclusion in a viewing user's ephemeral content feed. A topic-based ephemeral content collection can be included in the viewing user's ephemeral content feed for a predetermined time period (e.g., second(s), minute(s), hour(s), day(s), etc.). In some embodiments, a value model for ranking topic-based ephemeral content collections can be different from a value model for ranking user-based ephemeral content collections. For example, a probability of a viewing user sending a direct message to an authoring user of an ephemeral content item included in a topic-based ephemeral content collection is likely low since the viewing user probably is not a connection of the authoring user. Accordingly, in this example, P(dm) may not be included in the value model for ranking topic-based ephemeral content collections or may be given a low weight in the value model.

A machine learning model can be trained to rank topic-based ephemeral content collections. In some embodiments, one machine learning model can be trained to rank both user-based ephemeral content collections and topic-based ephemeral content collections. In other embodiments, separate machine learning models can be trained to rank user-based ephemeral content collections and topic-based ephemeral content collections. The ephemeral content collection training module 204 can train a machine learning model based on training data relating to topic-based ephemeral content collections. For example, for topic-based ephemeral content collections, the training data (labeled data) can indicate whether topic-based ephemeral content collections have been selected by viewing users, whether viewing users spent time in connection with topic-based ephemeral content collections or ephemeral content items thereof, an amount of time spent by viewing users in connection with topic-based ephemeral content collections or ephemeral content items thereof, whether viewing users abandoned topic-based ephemeral content collections or ephemeral content items thereof, a degree of connection between a viewing user and an authoring user of an ephemeral content item included in a topic-based ephemeral content collection, a viewing user's interest in a topic or a subject matter associated with a topic-based ephemeral content collection, reactions or types of reactions in connection with topic-based ephemeral content collections or ephemeral content items thereof. Various features can be used in training the machine learning model. Similar to user-based ephemeral content collections, features for training the machine learning model can be selected from ephemeral content collection attributes, ephemeral content item attributes, user attributes, etc. Examples of ephemeral content collection attributes relating to topic-based ephemeral content collections can include one or more ephemeral content items included in a topic-based ephemeral content collection, a rate of selection of a topic-based ephemeral content collection by viewing users, a selection of a topic-based ephemeral content collection by a specific viewing user, a rate of selection of an ephemeral content item of a topic-based ephemeral content collection by viewing users, a selection of an ephemeral content item of a topic-based ephemeral content collection by a specific viewing user, etc. Ephemeral content item attributes and user attributes can be similar to ephemeral content item attributes and user attributes as described above in connection with ranking of user-based ephemeral content collections. The ephemeral content collection evaluation module 206 can apply the trained machine learning model to determine a score for each topic-based ephemeral content collection. At least some of the ranked topic-based ephemeral content collections can be provided in the viewing user's ephemeral content feed. For example, a predetermined number of top ranked topic-based ephemeral content collections can be provided in the viewing user's ephemeral content feed. As another example, ranked user-based ephemeral content collections and ranked topic-based ephemeral content collections can be ordered according to respective scores, and a predetermined number from ordered user-based ephemeral content collections and topic-based ephemeral content collections can be included in the viewing user's ephemeral content feed.

In some embodiments, the ephemeral content collection ranking module 202 can also rank ephemeral content items within each ephemeral content collection included in a viewing user's ephemeral content feed. For example, an ephemeral content collection can include multiple ephemeral content items, and the ephemeral content items of an ephemeral content collection can be ranked to increase engagement by the viewing user. The ephemeral content collection training module 204 and the ephemeral content collection evaluation module 206 can train and apply a machine learning model to rank ephemeral content items of ephemeral content collections. For example, the ephemeral content collection training module 204 can train the machine learning model based on training data that includes ephemeral content item attributes. For example, the training data can indicate whether ephemeral content items have been selected by viewing users, whether viewing users sent direct messages in connection with ephemeral content items, whether viewing users spent time in connection with ephemeral content items, an amount of time spent by viewing users in connection with ephemeral content items, whether viewing users abandoned ephemeral content items, any events that occurred in connection with ephemeral content items, etc. Various features can be used in training the machine learning model. For example, features can be selected from ephemeral content item attributes or any other attributes described above for ranking ephemeral content collections. As described above, ephemeral content item attributes can include any attributes associated with ephemeral content items. Examples of ephemeral content item attributes can include content attributes, such as a type of media (e.g., an image, a video, an audio, text, etc.), a length of content, a subject matter, one or more objects represented in content, a popularity of content (e.g., many users interacting with content), etc. In other embodiments, ephemeral content items of each ephemeral content collection in a viewing user's ephemeral content feed are not ranked in the manner described above but rather are shown in chronological or reverse chronological order.

By utilizing a value model, the disclosed technology can provide a flexible way of ranking ephemeral content, such as ephemeral content collections and ephemeral messages. For example, value models can be adjusted as appropriate for different types of ephemeral content. In some embodiments, the disclosed technology can rank ephemeral content collections to optimize for a user other than a viewing user. For example, an authoring user's user-based ephemeral content collection or ephemeral content items thereof can be boosted until a certain level of feedback, such as likes, comments, or shares, is obtained. In these embodiments, a value of a selection of a user-based ephemeral content collection or an ephemeral content item to an authoring user can be higher in a value model than a value of a selection of a user-based ephemeral content collection or an ephemeral content item to a viewing user. All examples herein are provided for illustrative purposes, and there can be many variations and other possibilities.

Figure 2B:
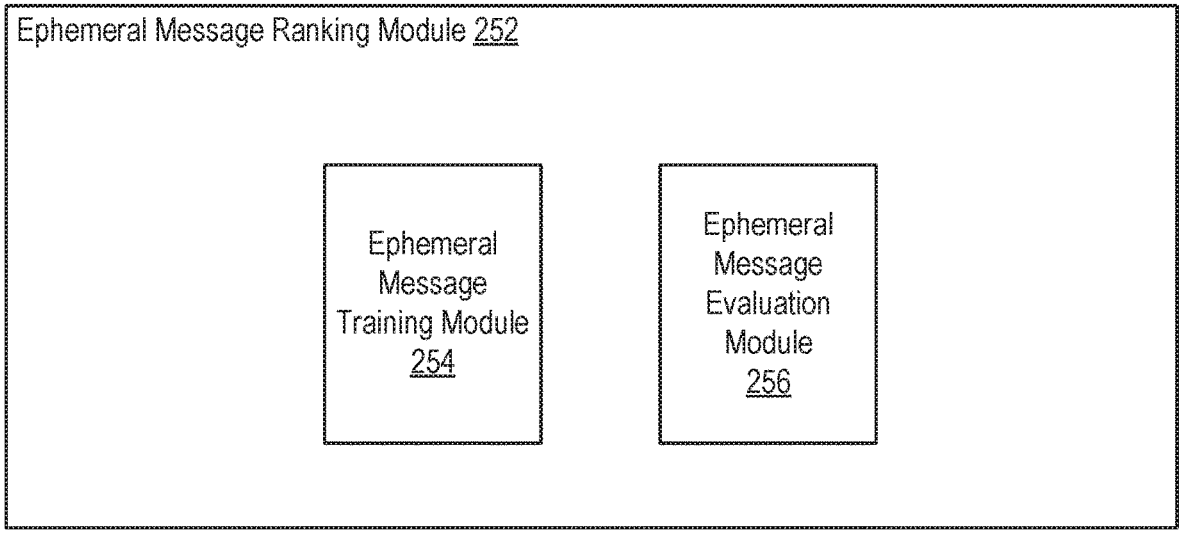
FIG. 2B illustrates an example ephemeral message ranking module configured to rank ephemeral message threads associated with a social networking system, according to an embodiment of the present disclosure.

FIG. 2B illustrates an example ephemeral message ranking module 252 configured to rank ephemeral message threads associated with a social networking system, according to an embodiment of the present disclosure. In some embodiments, the ephemeral message ranking module 106 of FIG. 1 can be implemented with the example ephemeral message ranking module 252. As shown in the example of FIG. 2B, the example ephemeral message ranking module 252 can include an ephemeral message training module 254 and an ephemeral message evaluation module 256. Ephemeral messages can be sent between or among users of a social networking system. An ephemeral message between users can be sent in an ephemeral message thread. With respect to a particular ephemeral message, a user that sends the ephemeral message can be referred to as a "sending user," and a user that receives the ephemeral message can be referred to as a "recipient user." If a user initially sends an ephemeral message to another user, an ephemeral message thread that includes the ephemeral message can be created. Any subsequent ephemeral messages between the two users can be included in the ephemeral message thread. A group ephemeral message can be an ephemeral message that is sent to multiple users, and an ephemeral message thread including group ephemeral messages can be referred to as a "group ephemeral message thread." An ephemeral message can expire for a recipient user upon viewing of message content of the ephemeral message by the recipient user. For example, message content of an ephemeral message may be provided for a predetermined time period (e.g., millisecond(s), second(s), minute(s), etc.) for viewing or until completion of an operation. For instance, if an ephemeral message includes an image, the ephemeral message can expire after displaying the image for a predetermined time period. Or, if an ephemeral message includes a video, the ephemeral message can expire after playback of a portion or all of the video. Ephemeral message threads can be provided in a user's ephemeral message feed in a user interface. In some embodiments, ephemeral message threads may be displayed with non-ephemeral message threads.

The ephemeral message ranking module 252 can rank ephemeral message threads for a user's ephemeral message feed. Ephemeral message threads can be ranked based on various factors, such as a probability of a recipient user selecting or otherwise interacting with an ephemeral message thread and a value model. The value model for ranking ephemeral message threads can be different from a value model for ranking user-based ephemeral content collections or a value model for ranking topic-based ephemeral content collections. For example, exchange or interaction between sending users and recipient users can be more important for ephemeral messages than for ephemeral content collections. Accordingly, the value model for ranking ephemeral message threads can include a probability of a recipient user responding to or otherwise interacting with an ephemeral message in an ephemeral message thread.

The ephemeral message training module 254 can train a machine learning model to rank ephemeral message threads for a user's ephemeral message feed, based on training data that includes ephemeral message threads, ephemeral messages, and various attributes associated with ephemeral message threads and ephemeral messages. For example, the training data can indicate whether ephemeral message threads or ephemeral messages have been selected or viewed by recipient users, whether recipient users spent time in connection with ephemeral message threads or ephemeral messages, an amount of time spent by recipient users in connection with ephemeral message threads or ephemeral messages, whether recipient users abandoned ephemeral message threads or ephemeral messages, whether recipient users responded to ephemeral messages, a strength of connection between a recipient user and a sending user, reactions or types of reactions in connection with ephemeral messages. Various features can be used in training the machine learning model. For example, features can be selected from ephemeral message thread or ephemeral message attributes, user attributes, etc. Examples of ephemeral message thread attributes or ephemeral message attributes can include a number of ephemeral messages that have not been seen by a recipient user in an ephemeral message thread, a number of ephemeral messages that have been seen by a recipient user in an ephemeral message thread, a number of users contributing to an ephemeral message thread, whether a recipient user responded to or otherwise interacted with an ephemeral message in an ephemeral message thread, etc. For example, a recipient user can respond to or interact with an ephemeral message by liking, commenting, sharing, etc. User attributes can include user attributes associated with recipient users and attributes associated with sending users. User attributes can be similar to user attributes described above in connection with ranking ephemeral content collections. In some embodiments, features can also be selected from ephemeral content collection attributes. For example, if a recipient user frequently selects an ephemeral content collection of a sending user and interacts with ephemeral content items of the sending user, ephemeral messages included in ephemeral message thread including the sending user can be ranked more highly. The ephemeral message training module 254 can determine which features are most successful in predicting increased engagement by users and use the determined features to train the machine learning model. Weights associated with various features used to train the machine learning model can be determined based on, for example, regression techniques.

The ephemeral message training module 254 can retrain the machine learning model based on new or updated training data. For example, if information about new ephemeral message threads, new ephemeral messages, and/or new users becomes available, the ephemeral message training module 254 can train the machine learning model based on the information about new ephemeral message threads, new ephemeral messages, and interactions of new users therewith. Engagement of users with ephemeral message threads and/or ephemeral messages can be measured and used to train or retrain the machine learning model, for example, as a part of the training data. In some cases, users can provide feedback relating to ephemeral message threads and/or ephemeral messages, and feedback by users can be used to train or retrain the machine learning model, for example, as a part of the training data.

The ephemeral message evaluation module 256 can apply the trained machine learning model to rank ephemeral message threads for a user's ephemeral message feed. The trained machine learning model can determine a score for each ephemeral message thread. For example, the score for the ephemeral message thread can be based on a probability of the user selecting the ephemeral message thread. The score for an ephemeral message thread can be indicative of a likelihood of engagement by the user. Ephemeral message threads can be ordered according to respective scores. In some embodiments, the ephemeral message evaluation module 256 can rank ephemeral message threads for a user's ephemeral message feed each time the ephemeral message feed is refreshed. In these embodiments, ordering of ephemeral message threads displayed to the user may change each time.

In some embodiments, the ephemeral message ranking module 252 can rank ephemeral message threads for a user based on a strength of connection between the user and other users. For example, ephemeral message threads including users that are close connections of the user can be ranked more highly. Whether a first user is a close connection of a second user can be determined based on a coefficient or weight associated with the connection. In certain embodiments, a strength of connection between a user and other users can be a feature in training the machine learning model.

Figure 3A:
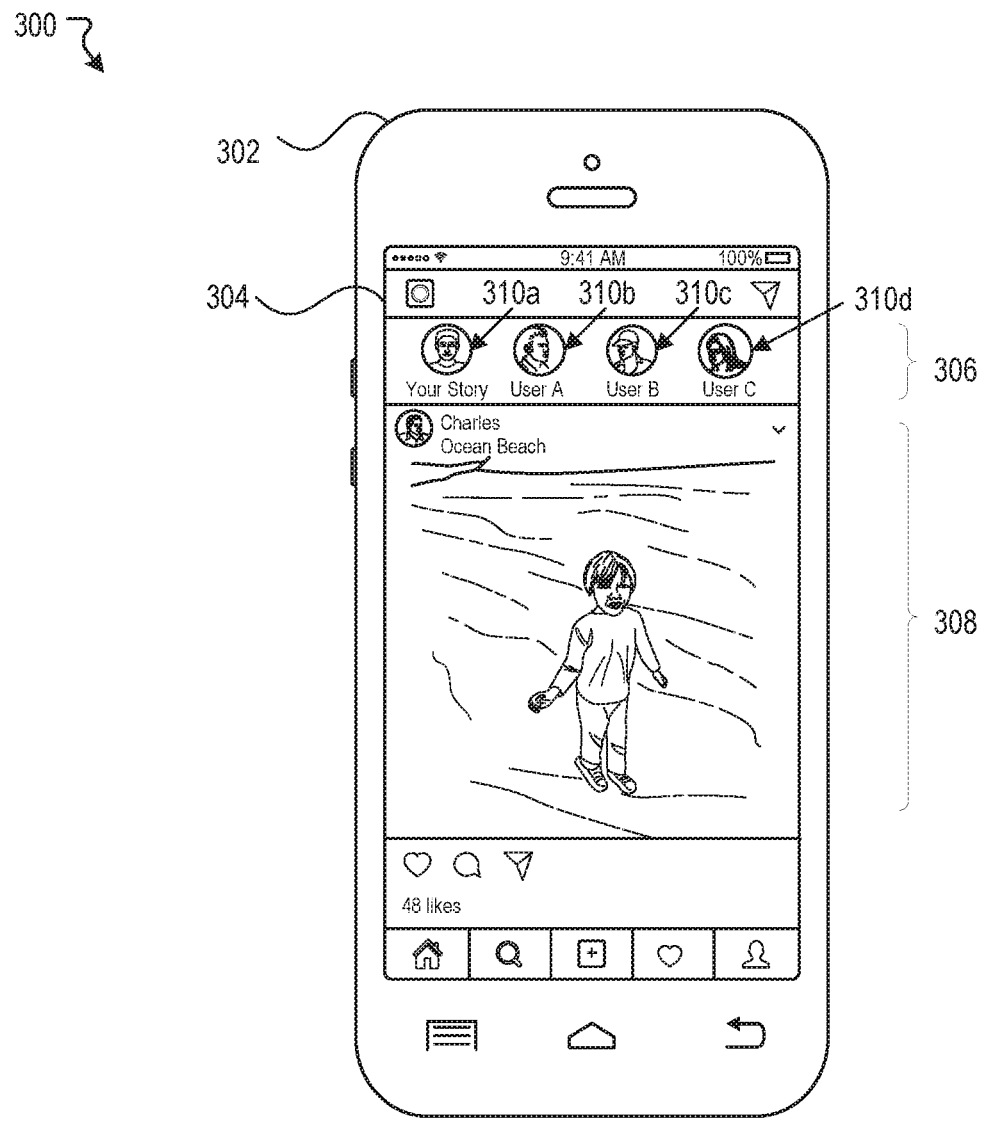
FIG. 3A illustrates an example scenario for providing ranked ephemeral content collections, according to an embodiment of the present disclosure.

FIG. 3A illustrates an example scenario 300 for providing ranked ephemeral content collections, according to an embodiment of the present disclosure. The example scenario 300 illustrates a computing device 302 displaying a user interface 304 associated with a social networking system. The user interface 304 includes an ephemeral content feed 306 of a user, which includes one or more user-based ephemeral content collections 310. In the example scenario 300, the user can be a viewing user, and user-based ephemeral content collections can be ranked as candidates for inclusion in the user's ephemeral content feed 306. The ranking of ephemeral content collections can be performed by the ephemeral content ranking module 102, as discussed herein. The user's ephemeral content feed 306 can include the user's own user-based ephemeral content collection 310a and a predetermined number of top ranked user-based ephemeral content collections 310. The example scenario 300 illustrates user-based ephemeral content collections 310a, 310b, 310c, and 310d in the user's ephemeral content feed 306. The user's ephemeral content feed 306 can be scrolled right in order to show more user-based ephemeral content collections. In some embodiments, the user's ephemeral content feed 306 can also include one or more topic-based ephemeral content collections. The user interface 304 also includes a feed 308 of the user, which can include non-ephemeral content items.

Figure 3B:
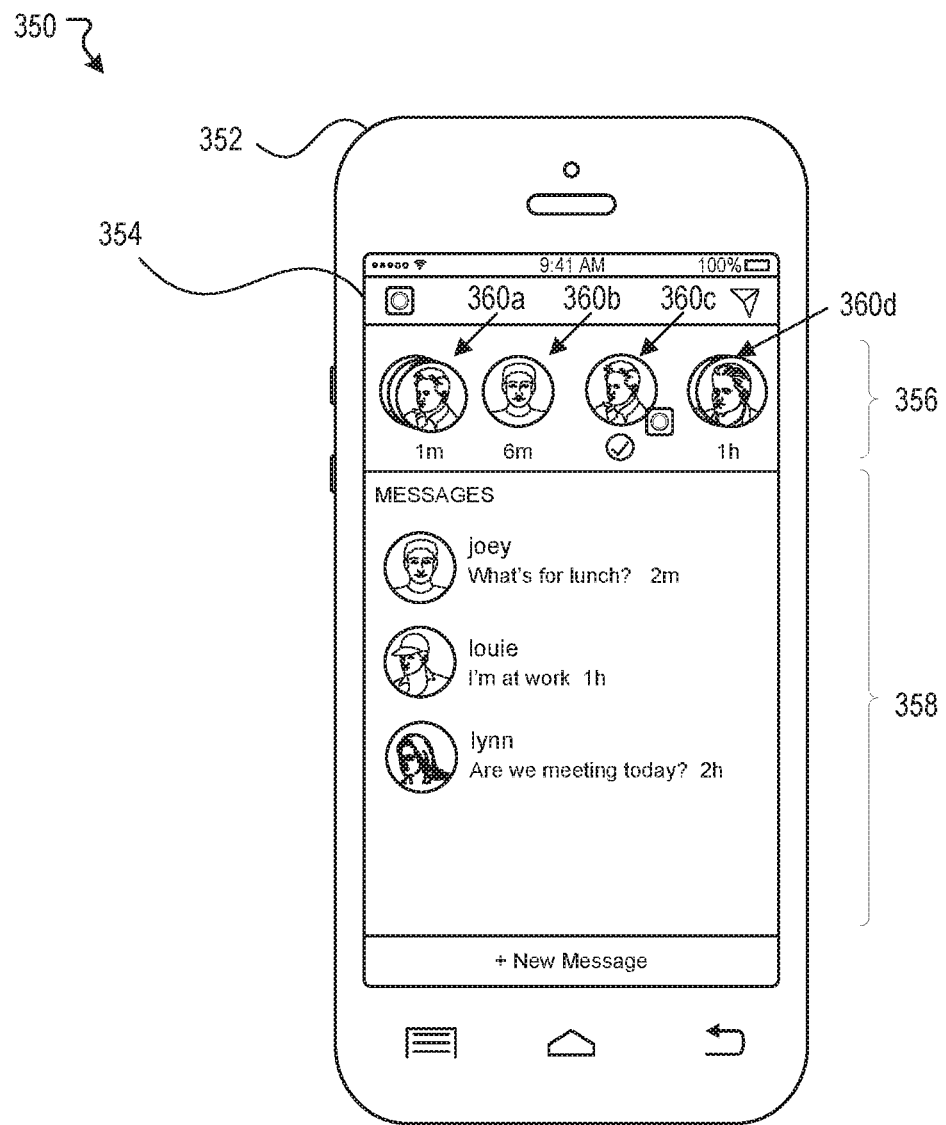
FIG. 3B illustrates an example scenario for providing ranked ephemeral messages, according to an embodiment of the present disclosure.

FIG. 3B illustrates an example scenario 350 for providing ranked ephemeral message threads, according to an embodiment of the present disclosure. The example scenario 350 illustrates a computing device 352 displaying a user interface 354 associated with a social networking system. The user interface 354 includes an ephemeral message feed 356 of a user, which includes one or more ephemeral message threads 360 between the user and other users. In the example scenario 350, ephemeral message threads can be ranked for the user's ephemeral message feed 356. The ephemeral content ranking module 102 can perform the ranking of the ephemeral message threads, as discussed herein. The example scenario 350 illustrates ephemeral message threads 360a, 360b, 360c, and 360d in the user's ephemeral message feed 356. The user's ephemeral message feed 356 can be scrolled right in order to show more ephemeral message threads. The user interface 354 also includes a message feed 358 of the user, which can include non-ephemeral messages.

FIG. 4 illustrates an example first method 400 for ranking ephemeral content associated with a social networking system, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a plurality of ephemeral content collections that are candidates for an ephemeral content feed of a user, wherein each of the plurality of ephemeral content collections includes one or more ephemeral content items. At block 404, the example method 400 can determine a score for each of the plurality of ephemeral content collections based at least in part on a probability of the user selecting the ephemeral content collection. At block 406, the example method 400 can rank the plurality of ephemeral content collections based on the respective scores of the plurality of ephemeral content collections. Other suitable techniques that incorporate various features and embodiments of the present disclosure are possible.

Figure 5:
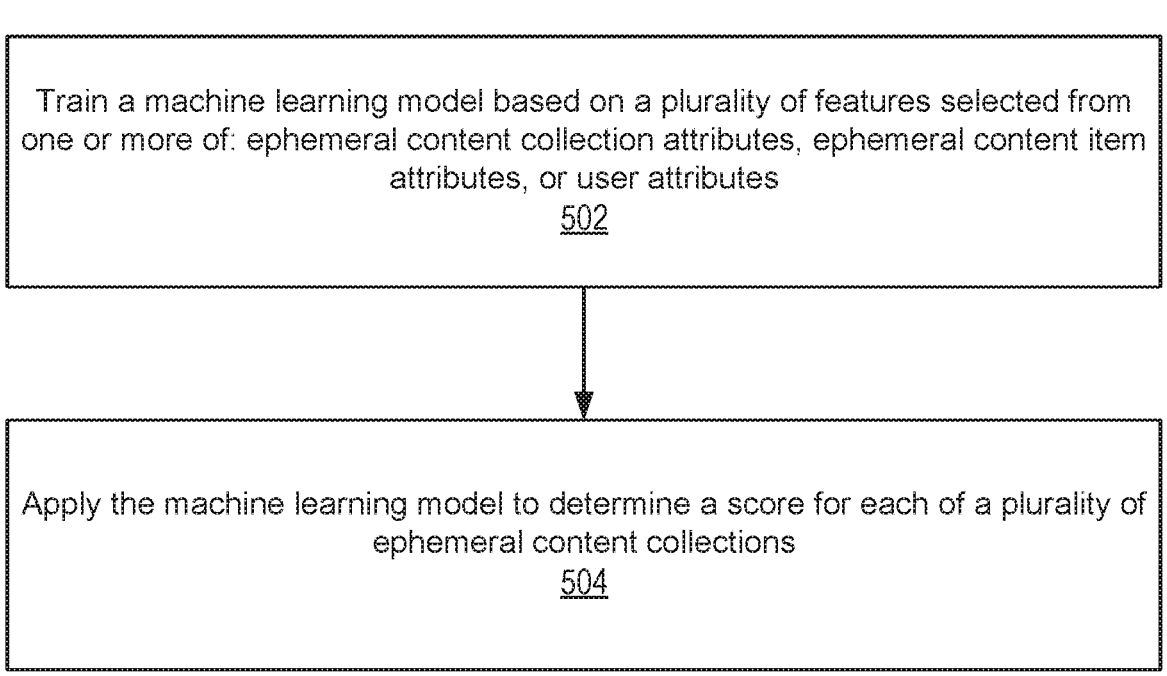
FIG. 5 illustrates an example second method for ranking ephemeral content associated with a social networking system, according to an embodiment of the present disclosure.

FIG. 5 illustrates an example second method 500 for ranking ephemeral content associated with a social networking system, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can train a machine learning model based on a plurality of features selected from one or more of: ephemeral content collection attributes, ephemeral content item attributes, or user attributes. At block 504, the example method 500 can apply the machine learning model to determine a score for each of a plurality of ephemeral content collections. The score can be similar to the score explained in connection with FIG. 4. The plurality of ephemeral content collections can be similar to the plurality of ephemeral content collections explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
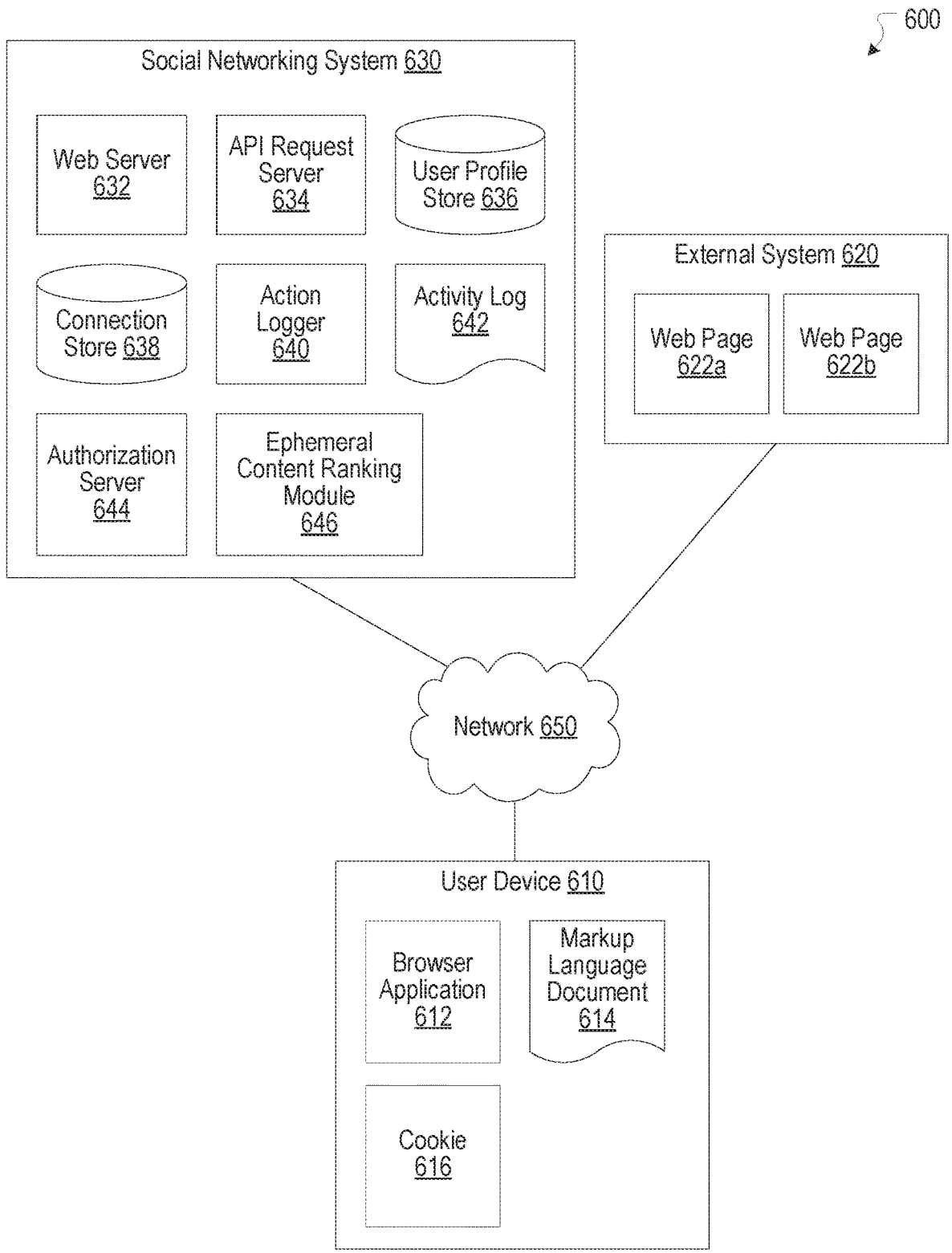
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an ephemeral content ranking module 646. The ephemeral content ranking module 646 can be implemented with the ephemeral content ranking module 102, as discussed in more detail herein. In some embodiments, one or more functionalities of the ephemeral content ranking module 646 can be implemented in the user device 610.

Hardware Implementation

Figure 7:
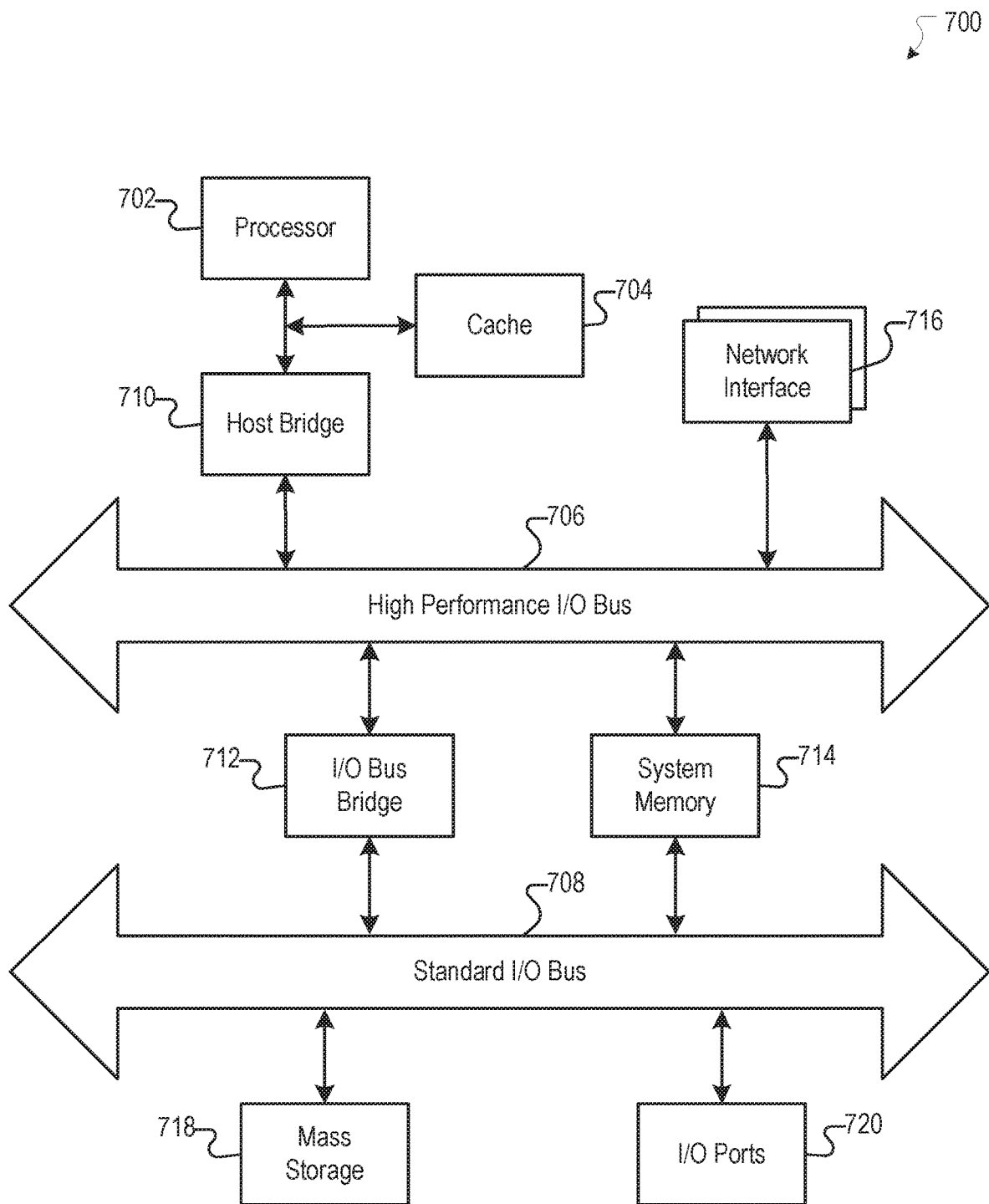
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
obtaining, by a computing system, a plurality of ephemeral content collections that are candidates for an ephemeral content feed of a user, wherein each of the plurality of ephemeral content collections includes one or more ephemeral content items;
training a machine learning model based on a plurality of features including at least one of ephemeral content collection attributes, ephemeral content item attributes, or user attributes;
applying the machine learning model to determine, by the computing system, a score for each of the plurality of ephemeral content collections based at least in part on a first probability of the user selecting the ephemeral content collection and a second probability of the user sending a direct message to an authoring user of at least one ephemeral content item included in the ephemeral content collection, wherein the first probability is based at least in part on a number of times the user has selected past ephemeral content collections that include at least one past ephemeral content item associated with the authoring user and the second probability is based at least in part on a connection between the user and the authoring user; and
ranking, by the computing system, the plurality of ephemeral content collections based on the respective scores of the plurality of ephemeral content collections.

2. The computer-implemented method of claim 1, wherein the score for each of the plurality of ephemeral content collections is determined based at least in part on a value model including one or more factors.

3. The computer-implemented method of claim 2, wherein the one or more factors include one or more of: a third probability of the user sending a direct message associated with the ephemeral content collection to another user, a fourth probability of the user spending time on the ephemeral content collection, or a fifth probability of the user abandoning the ephemeral content collection.

4. The computer-implemented method of claim 1, wherein each of the one or more ephemeral content items included in an ephemeral content collection of the plurality of ephemeral content collections is accessible only for a predetermined time period.

5. The computer-implemented method of claim 4, wherein an ephemeral content collection of the plurality of ephemeral content collections is accessible only when at least one of the one or more ephemeral content items included in the ephemeral content collection is accessible.

6. The computer-implemented method of claim 1, wherein each of the plurality of ephemeral content collections is associated with a specific user and includes one or ephemeral content items created by the specific user.

7. The computer-implemented method of claim 1, wherein each of the plurality of ephemeral content collections is associated with a topic and is not associated with a specific user.

8. The computer-implemented method of claim 1, further comprising ranking the one or more ephemeral content items included in an ephemeral content collection of the plurality of ephemeral content collections.

9. The computer-implemented method of claim 1, further comprising providing at least some of the ranked plurality of ephemeral content collections in the ephemeral content feed of the user.

10. A system comprising:
at least one hardware processor; and
a memory storing instructions that, when executed by the at least one processor, cause the system to perform:
obtaining a plurality of ephemeral content collections that are candidates for an ephemeral content feed of a user, wherein each of the plurality of ephemeral content collections includes one or more ephemeral content items;
training a machine learning model based on a plurality of features including at least one of ephemeral content collection attributes, ephemeral content item attributes, or user attributes;
applying the machine learning model to determine a score for each of the plurality of ephemeral content collections based at least in part on a first probability of the user selecting the ephemeral content collection and a second probability of the user sending a direct message to an authoring user of at least one ephemeral content item included in the ephemeral content collection, wherein the first probability is based at least in part on a number of times the user has selected past ephemeral content collections that include at least one past ephemeral content item associated with the authoring user and the second probability is based at least in part on a connection between the user and the authoring user; and
ranking the plurality of ephemeral content collections based on the respective scores of the plurality of ephemeral content collections.

11. The system of claim 10, wherein the score for each of the plurality of ephemeral content collections is determined based at least in part on a value model including one or more factors.

12. The system of claim 11, wherein the one or more factors include one or more of: a third probability of the user sending a direct message associated with the ephemeral content collection to another user, a fourth probability of the user spending time on the ephemeral content collection, or a fifth probability of the user abandoning the ephemeral content collection.

13. The system of claim 10, wherein each of the one or more ephemeral content items included in an ephemeral content collection of the plurality of ephemeral content collections is accessible only for a predetermined time period.

14. The system of claim 10, wherein the instructions further cause the system to perform ranking the one or more ephemeral content items included in an ephemeral content collection of the plurality of ephemeral content collections.

15. A non-transitory computer readable medium including instructions that, when executed by at least one hardware processor of a computing system, cause the computing system to perform a method comprising:
obtaining a plurality of ephemeral content collections that are candidates for an ephemeral content feed of a user, wherein each of the plurality of ephemeral content collections includes one or more ephemeral content items;
training a machine learning model based on a plurality of features including at least one of ephemeral content collection attributes, ephemeral content item attributes, or user attributes;
applying the machine learning model to determine a score for each of the plurality of ephemeral content collections based at least in part on a first probability of the user selecting the ephemeral content collection and a second probability of the user sending a direct message to an authoring user of at least one ephemeral content item included in the ephemeral content collection, wherein the first probability is based at least in part on a number of times the user has selected past ephemeral content collections that include at least one past ephemeral content item associated with the authoring user and the second probability is based at least in part on a connection between the user and the authoring user; and ranking the plurality of ephemeral content collections based on the respective scores of the plurality of ephemeral content collections.

16. The non-transitory computer readable medium of claim 15, wherein the score for each of the plurality of ephemeral content collections is determined based at least in part on a value model including one or more factors.

17. The non-transitory computer readable medium of claim 16, wherein the one or more factors include one or more of: a third probability of the user sending a direct message associated with the ephemeral content collection to another user, a fourth probability of the user spending time on the ephemeral content collection, or a fifth probability of the user abandoning the ephemeral content collection.

18. The non-transitory computer readable medium of claim 15, wherein each of the one or more ephemeral content items included in an ephemeral content collection of the plurality of ephemeral content collections is accessible only for a predetermined time period.

19. The non-transitory computer readable medium of claim 15, wherein the method further comprises ranking the one or more ephemeral content items included in an ephemeral content collection of the plurality of ephemeral content collections.

* * * * *